(12) United States Patent
Chen et al.

(10) Patent No.: US 11,262,914 B2
(45) Date of Patent: Mar. 1, 2022

(54) SOLID-STATE DRIVE AND PERFORMANCE OPTIMIZATION METHOD FOR SOLID-STATE DRIVE

(71) Applicant: GIGA-BYTE TECHNOLOGY CO., LTD., New Taipei (TW)

(72) Inventors: Hung-Cheng Chen, New Taipei (TW); Tse-Hsien Liao, New Taipei (TW)

(73) Assignee: GIGA-BYTE TECHNOLOGY CO., LTD., New Taipei (TW)

( * ) Notice: Subject to any disclaimer, the term of this patent is extended or adjusted under 35 U.S.C. 154(b) by 36 days.

(21) Appl. No.: 16/861,241

(22) Filed: Apr. 29, 2020

(65) Prior Publication Data
US 2020/0356279 A1 Nov. 12, 2020

(30) Foreign Application Priority Data
May 10, 2019 (TW) ................. 108116125

(51) Int. Cl.
*G06F 3/06* (2006.01)
*G06F 11/30* (2006.01)
*G06F 12/02* (2006.01)

(52) U.S. Cl.
CPC ............ *G06F 3/0611* (2013.01); *G06F 3/064* (2013.01); *G06F 3/0626* (2013.01); *G06F 3/0629* (2013.01); *G06F 3/0653* (2013.01); *G06F 3/0659* (2013.01); *G06F 3/0679* (2013.01); *G06F 11/3058* (2013.01);
(Continued)

(58) Field of Classification Search
None
See application file for complete search history.

(56) References Cited

U.S. PATENT DOCUMENTS

| 8,996,450 | B1 | 3/2015 | Rubio |
| 9,959,209 | B1 | 5/2018 | Burton et al. |
| 9,992,659 | B1 * | 6/2018 | Amireddy ............. H04M 15/47 |

(Continued)

FOREIGN PATENT DOCUMENTS

| CN | 108710475 | 10/2018 |
| JP | 3210511 | 5/2017 |

(Continued)

OTHER PUBLICATIONS

Office Action of Japan Counterpart Application, dated Jun. 15, 2021, pp. 1-6.

(Continued)

*Primary Examiner* — Kevin Verbrugge
(74) *Attorney, Agent, or Firm* — JCIPRNET

(57) ABSTRACT

A solid-state drive and a performance optimization method for the solid-state drive are provided. The performance optimization method for the solid-state drive includes the following steps: detecting a queue depth of the solid-state drive to determine a use proportion of the queue depth; determining whether an access speed of the solid-state drive is raisable when the use proportion of the queue depth is higher than a first threshold proportion, so as to raise the access speed of the solid-state drive; and determining whether the access speed of the solid-state drive is reduceable when the use proportion of the queue depth is lower than a second threshold proportion, so as to reduce the access speed of the solid-state drive.

18 Claims, 4 Drawing Sheets

(52) U.S. Cl.
CPC ...... *G06F 12/0246* (2013.01); *G06F 2201/81* (2013.01); *G06F 2212/1016* (2013.01)

(56) References Cited

U.S. PATENT DOCUMENTS

| | | | |
|---|---|---|---|
| 11,054,884 B2* | 7/2021 | Skerry | G06F 1/3209 |
| 2011/0222540 A1* | 9/2011 | Mital | G06F 15/167 |
| | | | 370/392 |
| 2013/0111175 A1* | 5/2013 | Mogul | H04L 47/10 |
| | | | 711/167 |
| 2016/0062421 A1 | 3/2016 | Sugawara et al. | |
| 2017/0075622 A1 | 3/2017 | Kwon et al. | |
| 2018/0074743 A1 | 3/2018 | Jeter et al. | |
| 2018/0260152 A1 | 9/2018 | Bar et al. | |
| 2018/0356996 A1 | 12/2018 | Benisty et al. | |
| 2019/0094938 A1 | 3/2019 | Tidwell et al. | |
| 2019/0138233 A1 | 5/2019 | Mun et al. | |

FOREIGN PATENT DOCUMENTS

| | | |
|---|---|---|
| TW | I409641 | 9/2013 |
| TW | 201407354 | 2/2014 |
| TW | 201423567 | 6/2014 |
| TW | I672591 | 9/2019 |
| WO | 2012118605 | 9/2012 |

OTHER PUBLICATIONS

"Office Action of Taiwan Counterpart Application", dated Jun. 20, 2020, p. 1-p. 5.
"Search Report of Europe Counterpart Application", dated Sep. 11, 2020, p. 1-p. 10.

* cited by examiner

SOLID-STATE DRIVE AND PERFORMANCE OPTIMIZATION METHOD FOR SOLID-STATE DRIVE

CROSS-REFERENCE TO RELATED APPLICATION

This application claims the priority benefit of Taiwan patent application serial no. 108116125, filed on May 10, 2019. The entirety of each of the above-mentioned patent applications is hereby incorporated by reference and made a part of this specification.

BACKGROUND

Technical Field

The disclosure relates to a hard drive and a hard drive optimization method, and particularly relates to a solid-state drive and a performance optimization method for the solid-state drive.

Description of Related Art

With the evolution of data storage devices, solid-state drives (SSDs) have currently become the mainstream storage devices, for the reason that the SSDs may provide high data access speeds. However, the conventional SSD may only be operated at a fixed access speed which is preset by a manufacturer at the time of manufacture. Namely, when a user purchases an SSD and uses the SSD, the user may only operate the SSD at a fixed access speed. In other words, regardless of a current use state of the SSD, since the access speed and power consumption of the SSD are not changed, the conventional SSD cannot effectively maintain good operating performance under certain specific access situations. Therefore, solutions of a plurality of exemplary embodiments are provided below.

SUMMARY

The invention is directed to a solid-state drive and a performance optimization method for the solid-state drive, which are adapted to correspondingly adjust an access speed of the solid-state drive according to a current use state of the solid-state drive, so as to automatically optimize an operating performance of the solid-state drive.

The invention provides a performance optimization method for a solid-state drive, which includes the following steps. A queue depth of the solid-state drive is detected to determine a use proportion of the queue depth. It is determined whether an access speed of the solid-state drive is raisable when the use proportion of the queue depth is higher than a first threshold proportion, so as to raise the access speed of the solid-state drive. It is determined whether the access speed of the solid-state drive is reduceable when the use proportion of the queue depth is lower than a second threshold proportion, so as to reduce the access speed of the solid-state drive.

The invention provides a solid-state drive including a solid-state drive controller and a performance optimization firmware. The performance optimization firmware is coupled to the solid-state drive controller. The performance optimization firmware is configured to detect a queue depth of the solid-state drive to determine a use proportion of the queue depth. The performance optimization firmware determines whether an access speed of the solid-state drive is raisable when the use proportion of the queue depth is higher than a first threshold proportion, so as to raise the access speed of the solid-state drive. The performance optimization firmware determines whether the access speed of the solid-state drive is reduceable when the use proportion of the queue depth is lower than a second threshold proportion, so as to reduce the access speed of the solid-state drive.

Based on the above description, the solid-state drive and the performance optimization method for the solid-state drive of the invention are adapted to automatically determine a use state of the queue depth of the SSD, so as to correspondingly adjust the access speed of the solid-state drive. Therefore, the solid-state drive and the performance optimization method for the solid-state drive of the invention may effectively optimize the operating performance of the solid-state drive.

To make the aforementioned more comprehensible, several embodiments accompanied with drawings are described in detail as follows.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DESCRIPTION OF THE EMBODIMENTS

Figure 1:
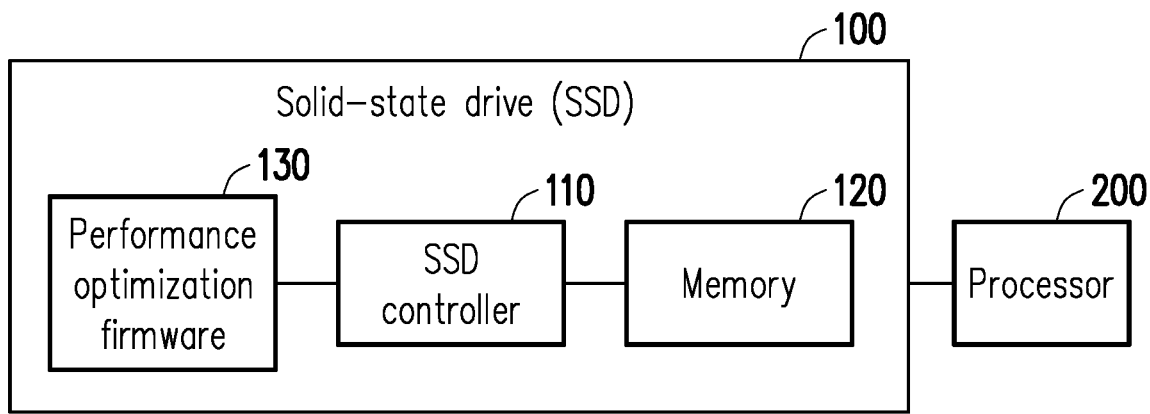
FIG. 1 is a functional block diagram of a computer system according to an embodiment of the invention.

A term "couple" used in the full text of the disclosure (including the claims) refers to any direct and indirect connections. For example, if a first device is described to be coupled to a second device, it is interpreted as that the first device is directly coupled to the second device, or the first device is indirectly coupled to the second device through other devices or connection means. Moreover, wherever possible, components/members/steps using the same referential numbers in the drawings and description refer to the same or like parts. Components/members/steps using the same referential numbers or using the same terms in different embodiments may cross-refer related descriptions.

FIG. 1 is a functional block diagram of a computer system according to an embodiment of the invention. Referring to FIG. 1, the computer system 10 includes a solid-state drive (SSD) 100 and a processor 200. The SSD 100 includes an SSD controller 110, a memory 120 and a performance optimization firmware 130. The SSD controller 110 is coupled to the memory 120. The memory 120 may be a flash memory, such as a NAND-type flash memory, but the invention is not limited thereto. In the embodiment, the SSD 100 is, for example, installed on a motherboard of a computer, and is coupled to the processor 200. Therefore, when the computer is powered on, the processor 200 may start and access the SSD 100, and the processor 200 may read and execute the performance optimization firmware 130 to automatically optimize an operating performance of the SSD 100. In the embodiment, the performance optimization firmware 130 may be, for example, pre-written into the memory 120 of the SSD 100 or pre-stored in other memories of the SSD 100, which is not limited by the invention. Even, in one embodiment, the performance optimization firmware 130 may be an application program (APP), and may be stored in other storage units other than the SSD 100.

Figure 2:
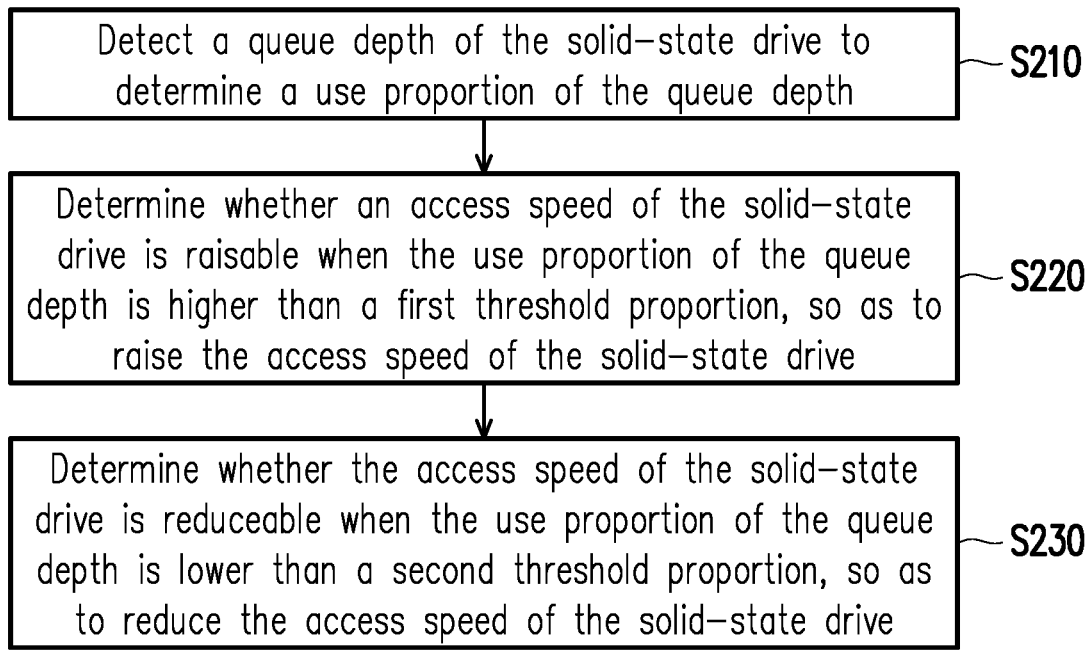
FIG. 2 is a flowchart illustrating a performance optimization method for a solid-state drive according to an embodiment of the invention.

FIG. 2 is a flowchart illustrating a performance optimization method for a solid-state drive according to an embodiment of the invention. Referring to FIG. 1 and FIG. 2, the performance optimization method of the embodiment is at least adapted to the computer system 10 of the embodiment of FIG. 1, where the processor 200 reads and executes the performance optimization firmware 130 to optimize the SSD 100. In a step S210, the processor 200 detects a queue depth of the SSD 100, and determines a use proportion of the queue depth. In a step S220, when the use proportion of the queue depth is higher than a first threshold proportion, the processor 200 determines whether an access speed of the SSD 100 is raisable, so as to raise the access speed of the SSD 100. In a step S230, when the use proportion of the queue depth is lower than a second threshold proportion, processor 200 determines whether the access speed of the SSD 100 is reduceable, so as to reduce the access speed of the SSD 100. Therefore, the computer system 10 of the embodiment may effectively optimize the performance of the SSD 100.

To be specific, the processor 200 of the embodiment may read the SSD controller 110 to obtain a queue depth value, and deduce a current use state of the SSD 100 according to the queue depth value. In addition, the queue depth may represent a total number of access operations of the SSD 100 at a current time. In other words, the performance optimization method of the embodiment is to dynamically adjust the access speed of the SSD 100 according to a real-time access state of the SSD 100. In an embodiment, the use proportion of the queue depth being higher than the first threshold proportion may refer to that a total use number of the queue depth is greater than 50%, and the use proportion of the queue depth being lower than the second threshold proportion may refer to that the total use number of the queue depth is less than 10%. Namely, when the processor 200 determines that the SSD 100 is currently operated in a high-access state, the processor 200 may automatically raise the access speed of the SSD 100 to accelerate the access speed. When the processor 200 determines that the SSD 100 is currently operated in a low-access state, the processor 200 may automatically reduce the access speed of the SSD 100 to reduce power consumption.

It should be noted that the aforementioned raising or reducing the access speed of the SSD 100 may refer to, for example, raising or reducing an operating frequency of the SSD controller 110 or/and the memory 120 to raise or reduce the access speed of the SSD 100. Moreover, in an embodiment, before the processor 200 determines the access state of the SSD 100, the processor 200 may determine the access speed of the SSD 100 in advance according to a type of data currently accessed in the SSD 100. For example, when the processor 200 determines that the type of the currently accessed data is file data with a larger data amount, such as an image editing program or a game program, the processor 200 may preset an operating frequency of the SSD 100 to a higher frequency. Alternatively, when the processor 200 determines that the type of the currently accessed data is file data with a smaller data amount, such as an image file or a music file, the processor 200 may preset the operating frequency of the SSD 100 to a lower frequency. Then, the processor 200 detects the queue depth of the SSD 100 to, for example, execute the aforementioned steps S210 to S230.

Figure 3A:
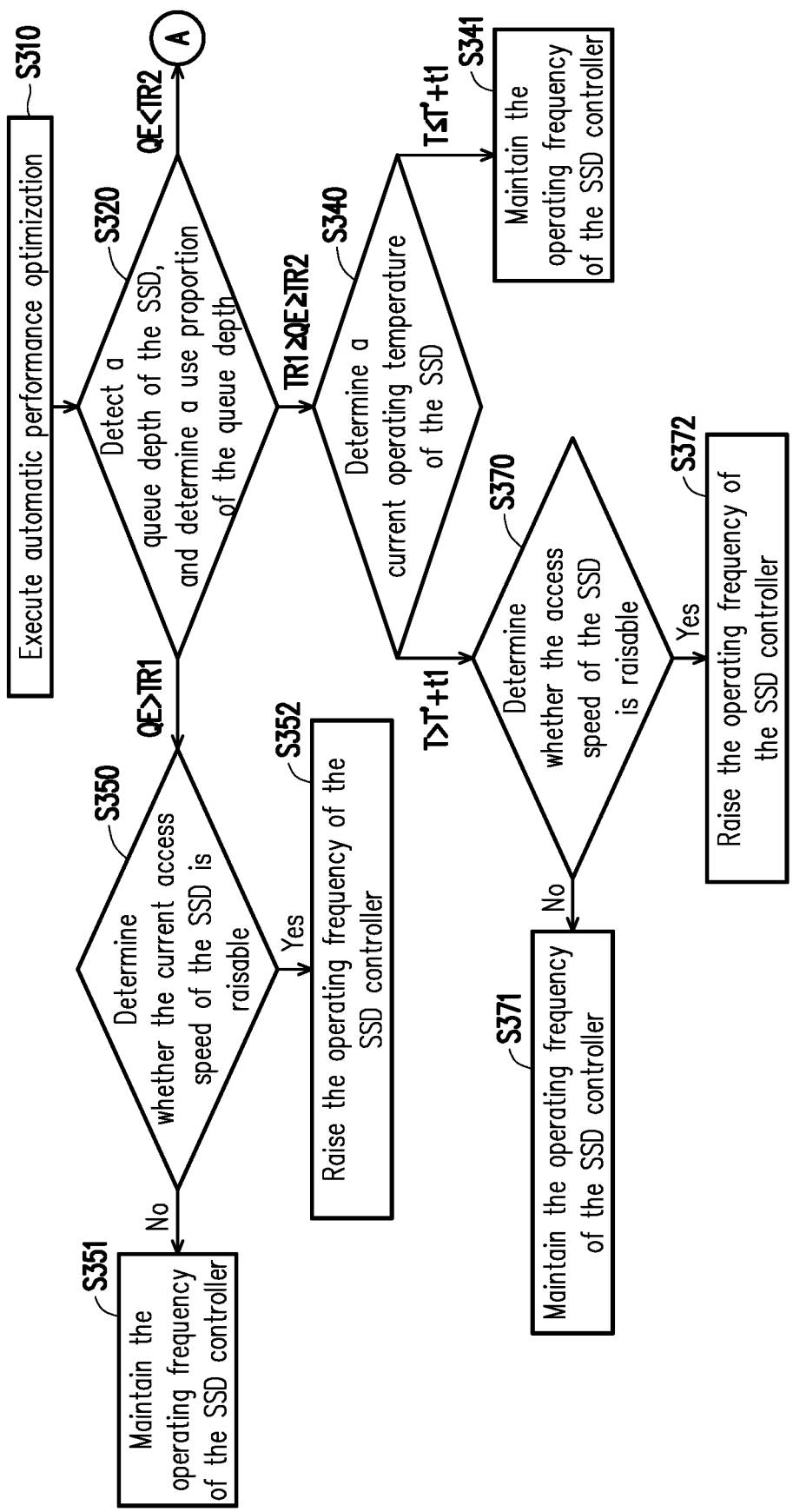
FIG. 3A and FIG. 3B are flowcharts illustrating a performance optimization method for a solid-state drive according to another embodiment of the invention.
Figure 3B:
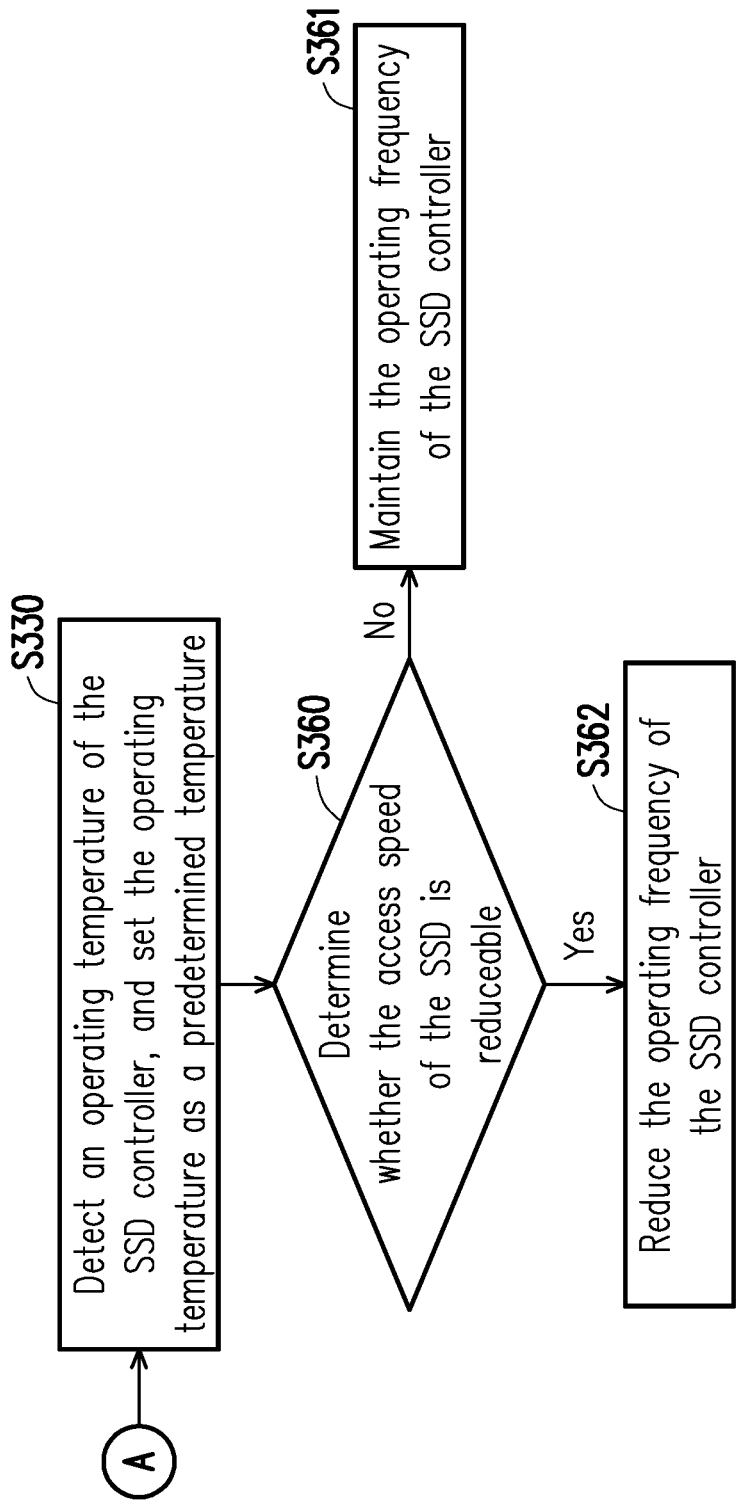

FIG. 3A and FIG. 3B are flowcharts illustrating a performance optimization method for a solid-state drive according to another embodiment of the invention. Referring to FIG. 1, FIG. 3A and FIG. 3B, the performance optimization method of the embodiment is at least adapted to the computer system 10 of the embodiment of FIG. 1, where the processor 200 reads and executes the performance optimization firmware 130 to optimize the SSD 100. Moreover, compared to the embodiment of FIG. 2, the performance optimization method of the embodiment further adjusts the access speed according to a temperature of the SSD 100. In a step S310, the processor 200 executes automatic performance optimization of the SSD 100. In a step S320, the processor 200 detects a queue depth QE of the SSD 100, and determines a use proportion of the queue depth QE.

When the queue depth QE is lower than a second threshold proportion TR2 (QE<TR2), the processor 200 executes a step S330. In the step S330, the processor 200 detects a current operating temperature T measured by the SSD controller 110, and sets the current operating temperature T as a predetermined temperature T'. Then, in a step S360, the processor 200 determines whether the current access speed of the SSD 100 is reduceable. If not, it represents that the current operating frequency of the SSD controller 110 or/and the memory 120 has reached a predetermined minimum frequency. In a step S361, the processor 200 maintains the operating frequency of the SSD controller 110 or/and the memory 120. If yes, it represents that the current operating frequency of the SSD controller 110 or/and the memory 120 is higher than the predetermined minimum frequency. In a step S362, the processor 200 reduces the current operating frequency of the SSD controller 110 or/and the memory 120 according to a predetermined reduction proportion (for example, a 10% reduction). In other words, when the SSD 100 is currently in a low-access state, the processor 200 may further reduce the operating frequency of the SSD controller 110 or/and the memory 120 to reduce the access speed of the SSD 100. In addition, a purpose of the step S330 is further explained. Since when the SSD 100 is just started, the use proportion of the queue depth QE of the SSD 100 must be low, in the step S330, the processor 200 may pre-record a current operating temperature of the SSD 100 (which may be taken as an initial operating temperature) to serve as a temperature determination reference for subsequent determination.

When the queue depth QE is greater than the first threshold proportion TR1 (QE>TR1), the processor 200 executes a step S350. In the step S350, the processor 200 determines whether the current access speed of the SSD 100 is raisable. If not, it represents that the current operating frequency of the SSD controller 110 or/and the memory 120 has reached a predetermined maximum frequency. In a step S351, the processor 200 maintains the operating frequency of the SSD controller 110. If yes, it represents that the current operating frequency of the SSD controller 110 or/and the memory 120 is lower than the predetermined maximum frequency. In a step S352, the processor 200 raises the current operating frequency of the SSD controller 110 or/and the memory 120 according to a predetermined raise proportion (for example, a 10% raise). In other words, when the SSD 100 is currently in a high-access state, the processor 200 may further raise the operating frequency of the SSD controller 110 or/and the memory 120 to raise the current access speed of the SSD 100.

When the queue depth QE is between the first threshold proportion TR1 and the second threshold proportion TR2 (TR1≥QE≥TR2), the processor 200 further determines the current operating temperature T of the SSD 100. When the current operating temperature T is lower than or equal to a predetermined temperature condition (T≤T'+t1), the processor 200 executes a step S341. In the step S341, the processor 200 maintains the operating frequency of the SSD controller 110 or/and the memory 120. When the current operating temperature T is higher than the predetermined temperature condition (T>T'+t1), the processor 200 executes a step S370. In the step S370, the processor 200 determines whether the current access speed of the SSD 100 is raisable. If not, it represents that the current operating frequency of the SSD controller 110 or/and the memory 120 has reached the predetermined maximum frequency. In a step S371, the processor 200 maintains the operating frequency of the SSD controller 110. If yes, it represents that the current operating frequency of the SSD controller 110 or/and the memory 120 is lower than the predetermined maximum frequency. In a step S372, the processor 200 raises the current operating frequency of the SSD controller 110 or/and the memory 120. In other words, in a normal access state of the SSD 100, if the current operating temperature measured by the SSD controller 110 is lower, the processor 200 maintains the access speed of the SSD 100. Conversely, if the current operating temperature measured by the SSD controller 110 is higher, it represents that the SSD 100 has been operated in a mode of a larger data access amount for a long time, so that the processor 200 may further raise the operating frequency of the SSD controller 110 or/and the memory 120, so as to raise the access speed of the SSD 100.

Moreover, the aforementioned predetermined temperature condition may refer to, for example, a predetermined temperature T' plus a predetermined value t1. Moreover, in an embodiment, the predetermined value t1 may be 20 degrees (° C.), but the invention is not limited thereto. In addition, according to another aspect, when the use proportion of the queue depth QE of the SSD 100 has become lower, even when the current operating temperature measured by the SSD controller 110 is still high (fully cooling is not yet achieved), the processor 200 may execute the steps S330 and S360 to determine whether to reduce the access speed of the SSD 100. Namely, the performance optimization method of the embodiment may dynamically adjust the access speed of the SSD 100 to determine whether to raise the access speed or reduce the power consumption according to the current access condition of the SSD 100. In addition, the performance optimization method of the embodiment may further adjust the access speed according to the temperature measured by the SSD controller 110.

Figure 4:
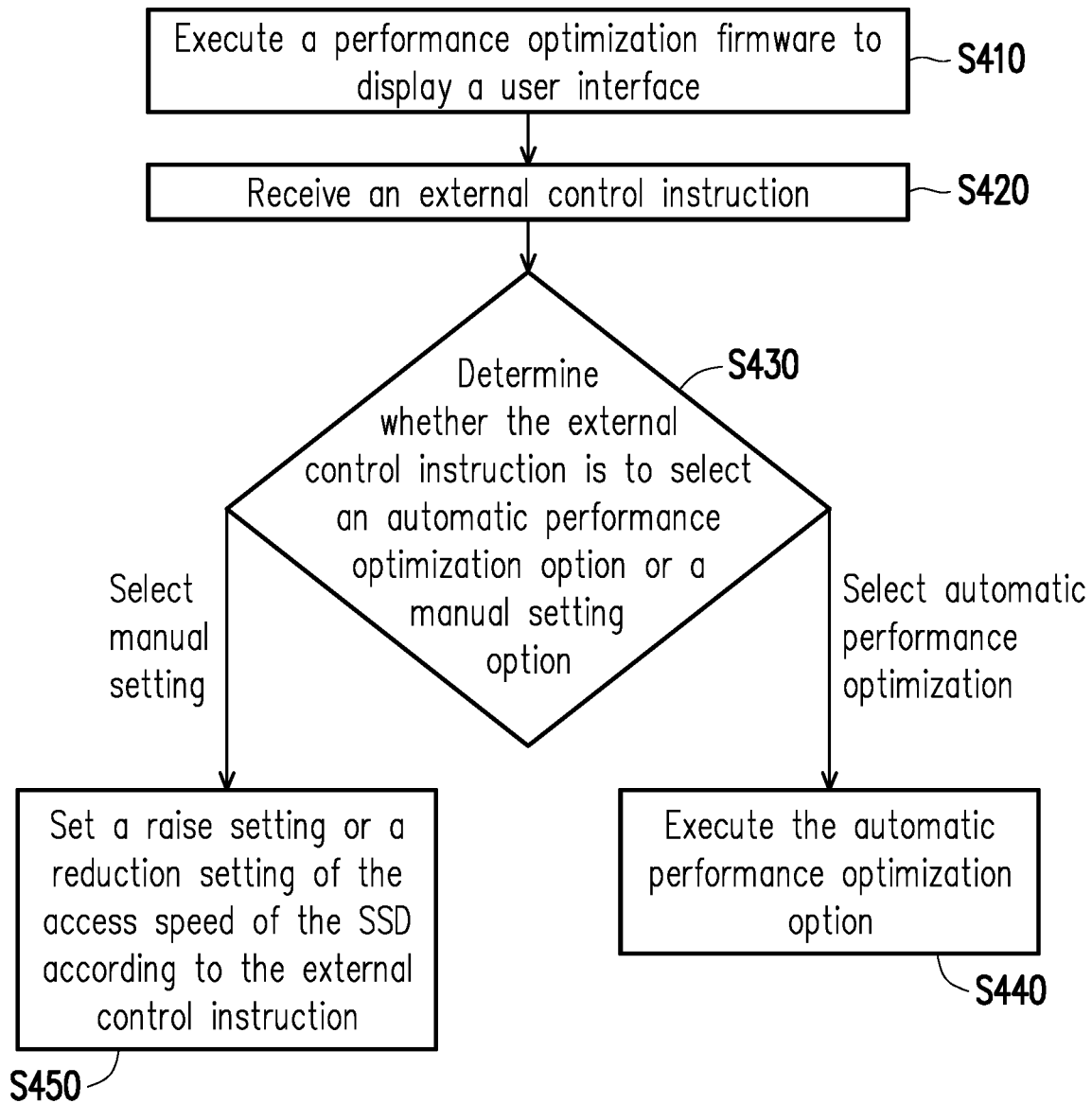
FIG. 4 illustrates an operation flow of a user interface according to an embodiment of the invention.

FIG. 4 illustrates an operation flow of a user interface according to an embodiment of the invention. Referring to FIG. 4, the operation flow of the user interface of the embodiment is at least adapted to the computer system 10 of the embodiment of FIG. 1, where when the processor 200 reads and executes the performance optimization firmware 130, the computer system 10 may execute the operation flow of the embodiment. In a step S410, when the computer system 10 is turned on or booted, the processor 200 executes the performance optimization firmware 130 to display a user interface through a display. The user interface may display two options, and the two options may be a manual setting option and an automatic performance optimization option. In a step S420, the computer system 10 may receive an external control instruction through an input device, such as a mouse or a keyboard. In a step S430, the processor 200 may determine whether the external control instruction is to select the automatic performance optimization option or the manual setting option. When the external control instruction is to select the automatic performance optimization option, the processor 200 executes a step S440. In the step S440, the processor 200 executes the automatic performance optimization option to perform the performance optimization method as shown in the embodiment of FIG. 2 or FIG. 3A and FIG. 3B. However, when the external control instruction is to select the manual setting option, the processor 200 sets a raise setting or a reduction setting of the access speed of the SSD 100 according to the external control instruction (further setting of the user). For example, the raise setting may include the first threshold proportion and the predetermined raise proportion in the aforementioned embodiment, and the reduction setting may include the second threshold proportion and the predetermined reduction proportion in the aforementioned embodiment. Therefore, the operation flow of the user interface of the embodiment may provide the user with the function of flexibly adjusting the access speed of the SSD 100.

In summary, the solid-state drive and the performance optimization method for the solid-state drive of the invention are adapted to automatically determine a use state of the queue depth of the SSD and detect an operating temperature of the SSD, so as to correspondingly adjust the access speed of the SSD according to the use state and the operating temperature of the SSD. Therefore, the SSD and the performance optimization method for the SSD of the invention may optimize the operating performance of the SSD to effectively achieve raise the access speed or reduce the power consumption.

It will be apparent to those skilled in the art that various modifications and variations can be made to the disclosed embodiments without departing from the scope or spirit of the invention. In view of the foregoing, it is intended that the invention covers modifications and variations provided they fall within the scope of the following claims and their equivalents.

What is claimed is:

1. A performance optimization method for a solid-state drive, comprising:

detecting a queue depth of the solid-state drive to determine a use proportion of the queue depth;

determining whether an access speed of the solid-state drive is raisable when the use proportion of the queue depth is higher than a first threshold proportion, so as to raise the access speed of the solid-state drive;

determining whether the access speed of the solid-state drive is reduceable when the use proportion of the queue depth is lower than a second threshold proportion, so as to reduce the access speed of the solid-state drive;

detecting an operating temperature of a solid-state drive controller;

maintaining the access speed of the solid-state drive when the use proportion of the queue depth is between the first threshold proportion and the second threshold proportion and the operating temperature is lower than or equal to a predetermined temperature condition, wherein the predetermined temperature condition is a predetermined temperature plus a predetermined value; and determining whether the access speed of the solid-state drive is raisable when the use proportion of the queue depth is between the first threshold proportion and the second threshold proportion and the operating temperature is higher than the predetermined temperature condition, so as to raise the access speed of the solid-state drive.

2. The performance optimization method for the solid-state drive as claimed in claim 1, further comprising:
detecting the operating temperature of the solid-state drive controller when the use proportion of the queue depth is lower than the second threshold proportion, and taking the operating temperature as the predetermined temperature.

3. The performance optimization method for the solid-state drive as claimed in claim 1, wherein before detecting the queue depth of the solid-state drive, the performance optimization method further comprises:
determining the access speed of the solid-state drive according to a type of data accessed in the solid-state drive.

4. The performance optimization method for the solid-state drive as claimed in claim 1, wherein the step of determining whether the access speed of the solid-state drive is raisable, so as to raise the access speed of the solid-state drive comprises:
maintaining an operating frequency of a solid-state drive controller when the operating frequency of the solid-state drive controller has reached a predetermined maximum frequency; and
raising the operating frequency of the solid-state drive controller according to a predetermined raise proportion when the operating frequency of the solid-state drive controller is lower than the predetermined maximum frequency.

5. The performance optimization method for the solid-state drive as claimed in claim 1, wherein the step of determining whether the access speed of the solid-state drive is reduceable, so as to reduce the access speed of the solid-state drive comprises:
maintaining an operating frequency of a solid-state drive controller when the operating frequency of the solid-state drive controller has reached a predetermined minimum frequency; and
reducing the operating frequency of the solid-state drive controller according to a predetermined reduction proportion when the operating frequency of the solid-state drive controller is higher than the predetermined minimum frequency.

6. The performance optimization method for the solid-state drive as claimed in claim 1, wherein the step of raising the access speed of the solid-state drive further comprises raising a memory frequency of a memory of the solid-state drive, and the step of reducing the access speed of the solid-state drive further comprises reducing the memory frequency of the memory of the solid-state drive.

7. The performance optimization method for the solid-state drive as claimed in claim 1, further comprising:
displaying a user interface, and receiving an external control instruction, wherein the user interface comprises an automatic performance optimization option; and
executing the step of detecting the queue depth of the solid-state drive to determine the use proportion of the queue depth when the external control instruction is to select the automatic performance optimization option.

8. The performance optimization method for the solid-state drive as claimed in claim 7, wherein the user interface comprises a manual setting option, and the performance optimization method further comprises:
setting a raise setting or a reduction setting of the access speed of the solid-state drive according to the external control instruction when the external control instruction is to select the manual setting option.

9. The performance optimization method for the solid-state drive as claimed in claim 8, wherein the raise setting comprises the first threshold proportion and a predetermined raise proportion, and the reduction setting comprises the second threshold proportion and a predetermined reduction proportion.

10. A solid-state drive comprising:
a solid-state drive controller; and
a performance optimization firmware coupled to the solid-state drive controller and configured to detect a queue depth of the solid-state drive to determine a use proportion of the queue depth,
wherein when the use proportion of the queue depth is higher than a first threshold proportion, the performance optimization firmware determines whether an access speed of the solid-state drive is raisable, so as to raise the access speed of the solid-state drive,
wherein when the use proportion of the queue depth is lower than a second threshold proportion, the performance optimization firmware determines whether the access speed of the solid-state drive is reduceable, so as to reduce the access speed of the solid-state drive,
wherein the performance optimization firmware detects an operating temperature of the solid-state drive controller,
wherein when the use proportion of the queue depth is between the first threshold proportion and the second threshold proportion and the operating temperature is lower than or equal to a predetermined temperature condition, the performance optimization firmware maintains the access speed of the solid-state drive, wherein the predetermined temperature condition is a predetermined temperature plus a predetermined value,
wherein when the use proportion of the queue depth is between the first threshold proportion and the second threshold proportion and the operating temperature is higher than the predetermined temperature condition, the performance optimization firmware determines whether the access speed of the solid-state drive is raisable, so as to raise the access speed of the solid-state drive.

11. The solid-state drive as claimed in claim 10, wherein when the use proportion of the queue depth is lower than the second threshold proportion, the performance optimization firmware detects the operating temperature of the solid-state drive controller, and takes the operating temperature as the predetermined temperature.

12. The solid-state drive as claimed in claim 10, wherein before detecting the queue depth of the solid-state drive, the performance optimization firmware determines the access speed of the solid-state drive according to a type of data accessed in the solid-state drive.

13. The solid-state drive as claimed in claim 10, wherein when an operating frequency of the solid-state drive controller has reached a predetermined maximum frequency, the performance optimization firmware maintains the operating frequency of the solid-state drive controller, and
when the operating frequency of the solid-state drive controller is lower than the predetermined maximum frequency, the performance optimization firmware raises the operating frequency of the solid-state drive controller according to a predetermined raise proportion.

14. The solid-state drive as claimed in claim 10, wherein when an operating frequency of the solid-state drive controller has reached a predetermined minimum frequency, the performance optimization firmware maintains the operating frequency of the solid-state drive controller, and when the operating frequency of the solid-state drive controller is higher than the predetermined minimum frequency, the performance optimization firmware reduces the operating frequency of the solid-state drive controller according to a predetermined reduction proportion.

15. The solid-state drive as claimed in claim 10, further comprising a memory, wherein the operation in which the performance optimization firmware raises the access speed of the solid-state drive further comprises raising a memory frequency of the memory, and the operation in which the performance optimization firmware reduces the access speed of the solid-state drive further comprises reducing the memory frequency of the memory.

16. The solid-state drive as claimed in claim 10, wherein the performance optimization firmware further comprises a user interface, the user interface comprises an automatic performance optimization option, and the performance optimization firmware receives an external control instruction, wherein when the external control instruction is to select the automatic performance optimization option, the performance optimization firmware executes the operation of detecting the queue depth of the solid-state drive to determine the use proportion of the queue depth.

17. The solid-state drive as claimed in claim 16, wherein the user interface comprises a manual setting option, and when the external control instruction is to select the manual setting option, the performance optimization firmware sets a raise setting or a reduction setting of the access speed of the solid-state drive according to the external control instruction.

18. The solid-state drive as claimed in claim 17, wherein the raise setting comprises the first threshold proportion and a predetermined raise proportion, and the reduction setting comprises the second threshold proportion and a predetermined reduction proportion.

* * * * *